United States Patent
Yu et al.

(10) Patent No.: US 8,995,913 B2
(45) Date of Patent: Mar. 31, 2015

(54) METHOD FOR PERFORMING COOPERATIVE FUNCTION AUTOMATICALLY AND DEVICE USING THE SAME

(75) Inventors: Seung-dong Yu, Osan-si (KR);
Woo-yong Chang, Yongin-si (KR);
Se-jun Park, Yongin-si (KR);
Min-jeong Moon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 445 days.

(21) Appl. No.: 12/862,301

(22) Filed: Aug. 24, 2010

(65) Prior Publication Data

US 2011/0045773 A1 Feb. 24, 2011

(30) Foreign Application Priority Data

Aug. 24, 2009 (KR) .................. 10-2009-0078349

(51) Int. Cl.
*H04B 7/00* (2006.01)
*G06F 13/38* (2006.01)

(52) U.S. Cl.
CPC ................... *G06F 13/385* (2013.01)
USPC ...... 455/41.2; 455/41.1; 455/404.2; 370/259; 370/338; 340/572.1; 709/201; 709/213

(58) Field of Classification Search
CPC .................................... G06F 21/6218
USPC ............... 455/41.1, 41.2, 404.2, 412.1, 420, 455/426.2, 456.1; 370/259, 338, 354; 340/572.1; 709/201, 213, 221, 223, 709/224
See application file for complete search history.

(56) References Cited

U.S. PATENT DOCUMENTS

| 6,297,805 | B1 | 10/2001 | Adler et al. |
| 6,665,717 | B1 * | 12/2003 | Aizono et al. ................ 709/224 |
| 7,228,137 | B2 * | 6/2007 | Chinomi et al. ........... 455/456.1 |
| 8,086,214 | B2 | 12/2011 | Naruse |
| 8,154,472 | B2 | 4/2012 | Yamaguchi et al. |
| 2005/0090294 | A1 | 4/2005 | Narasimhan |
| 2007/0273609 | A1 | 11/2007 | Yamaguchi et al. |
| 2008/0005767 | A1 * | 1/2008 | Seo ................................. 725/62 |
| 2008/0084577 | A1 | 4/2008 | Mihira |
| 2009/0253372 | A1 | 10/2009 | Naruse |

(Continued)

FOREIGN PATENT DOCUMENTS

| EP | 0 798 651 | 10/1997 |
| EP | 1 109 367 | 6/2001 |

(Continued)

OTHER PUBLICATIONS

Japanese Office Action dated Jun. 12, 2014 issued in counterpart Appln. No. 2010-187070.

(Continued)

*Primary Examiner* — Tuan H Nguyen
(74) *Attorney, Agent, or Firm* — The Farrell Law Firm, P.C.

(57) ABSTRACT

A method for performing a cooperative function and a device thereof are provided. It is determined whether another device is in a surrounding area of a device. When it is determined that the other device is in the surrounding area, the cooperative function is performed by the device with the other device according to a location of the other device. Accordingly, the cooperative function may be performed automatically if devices are in adjacent areas without a user's command.

22 Claims, 15 Drawing Sheets

(56) References Cited

U.S. PATENT DOCUMENTS

| | | |
|---|---|---|
| 2009/0254602 A1 | 10/2009 | Yoshida |
| 2009/0254980 A1 | 10/2009 | Kanaparti |
| 2012/0127168 A1 | 5/2012 | Yamaguchi et al. |
| 2013/0184002 A1* | 7/2013 | Moshfeghi ................ 455/456.1 |

FOREIGN PATENT DOCUMENTS

| | | |
|---|---|---|
| JP | 2001-167019 | 6/2001 |
| JP | 2005-354312 | 12/2005 |
| JP | 2007-259288 | 10/2007 |
| JP | 2008-003574 | 1/2008 |
| JP | 2009-253476 | 10/2009 |
| JP | 2010-011054 | 1/2010 |
| KR | 1020080005840 | 1/2008 |
| KR | 1020090011298 | 2/2009 |
| WO | WO 2005/004415 | 1/2005 |
| WO | WO 2008/085844 | 7/2008 |

OTHER PUBLICATIONS

Chinese Office Action dated Jul. 3, 2014 issued in counterpart Appln. No. 201010260479.4.

European Search Report dated Oct. 21, 2014 issued in counterpart application No. 10173898.7-1954.

Australian Examination Report dated Oct. 24, 2014 issued in counterpart application No. 2010287253.

Chinese Office Action dated Dec. 1, 2014 issued in counterpart application No. 201010260479.4.

Russian Office Action dated Dec. 4, 2014 issued in counterpart application No. 2012111311/08.

Australian Examination Report dated Feb. 12, 2015 issued in counterpart application No. 2010287253.

* cited by examiner

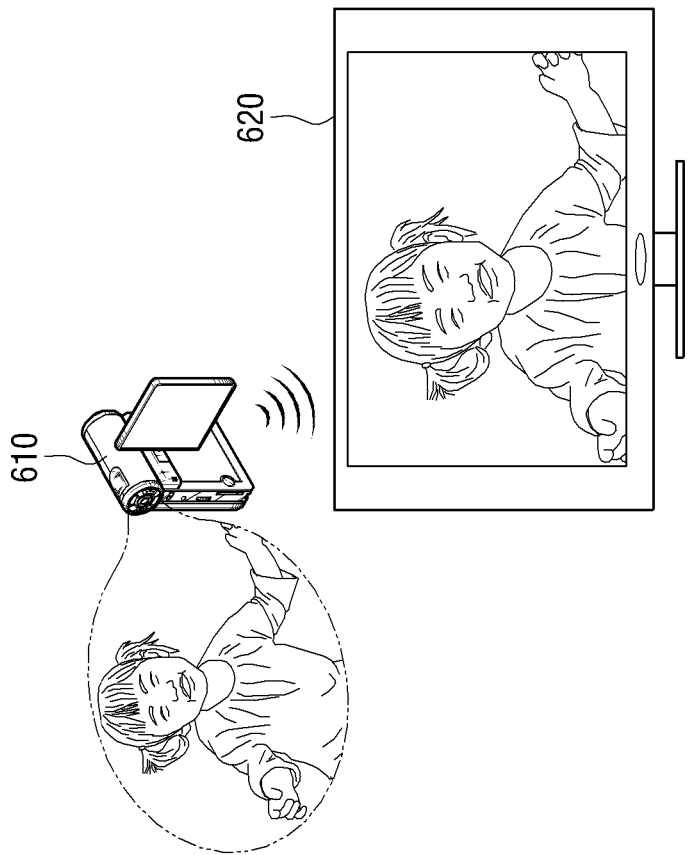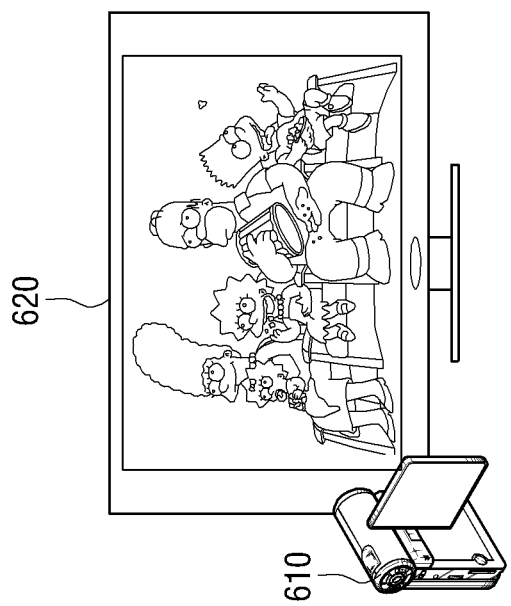

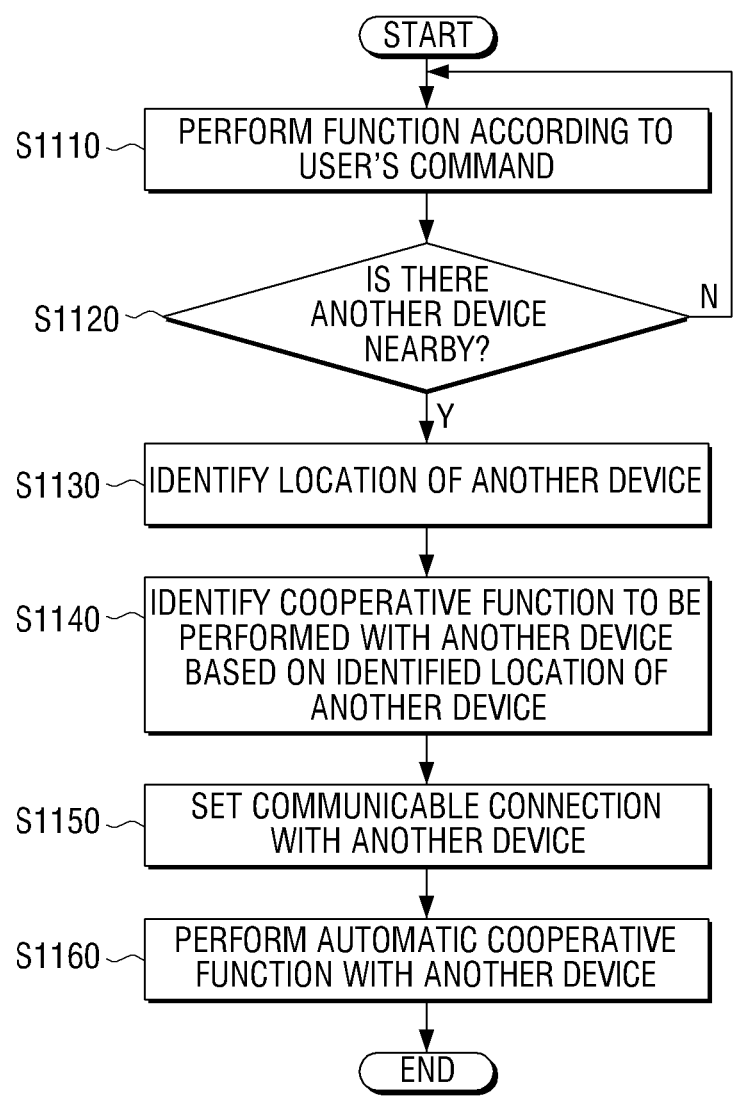

METHOD FOR PERFORMING COOPERATIVE FUNCTION AUTOMATICALLY AND DEVICE USING THE SAME

PRIORITY

This application claims priority under 35 U.S.C. §119(a) to Korean Patent Application No. 2009-0078349, filed Aug. 24, 2009, in the Korean Intellectual Property Office, the disclosure of which is incorporated herein by reference.

BACKGROUND OF THE INVENTION

1. Field of the Invention

The present invention relates generally to a method for performing a cooperative function and a device using the same, and more particularly, to a method for allowing a plurality of devices to perform a single cooperative function together, and a device using the same.

2. Description of the Related Art

With the advent of various digital devices, the number of digital devices that a single user possesses has increased significantly.

These various digital devices have provided increased convenience, and continue to become more sophisticated by incorporating multi-functions.

The user, however, still pursues digital devices having more advanced and sophisticated functions.

However, a digital device is limited in the number of functions it can perform on its own. Therefore, a method for converging and combining each device owned by the user is required to create a new function which can be performed by a plurality of digital devices.

SUMMARY OF THE INVENTION

The present invention has been made to address at least the above problems and/or disadvantages and to provide at least the advantages described below. Accordingly, an aspect of the present invention provides a method for performing a cooperative function if it is determined that there are other devices in the surrounding area, and a device using the same.

According to an aspect of the present invention, a method is provided for performing a cooperative function. It is determined whether another device in a surrounding area of a device. When it is determined that the other device is in the surrounding area, the cooperative function is performed by the device with the other device according to a location of the other device.

According to another aspect of the present invention, a device is provided for automatically performing a cooperative function with another device. The device includes a communication unit that determines whether another device is in a surrounding area of the device. The device also includes a controller that controls the device to automatically perform the cooperative function with the other device according to a location of the other device when it is determined that the other device is in a surrounding area.

According to an additional aspect of the present invention, a system is provided for performing a cooperative function automatically. The system includes a first device that automatically performs the cooperative function with at least one device. The system also includes a second device that determines whether the first device is in a surrounding area of the second device, and when it is determined that the first device is in the surrounding area, performs the cooperative function with the first device according to a location of the first device.

BRIEF DESCRIPTION OF THE DRAWINGS

The above and other aspects, features and advantages of the present invention will be more apparent from the following detailed description when taken in conjunction with the accompanying drawings, in which:

FIGS. 1A to 7B are diagrams illustrating a concept of performing a cooperative function automatically by devices in adjacent areas, according to embodiments of the present invention;

FIG. 11 is a flowchart illustrating a method for performing different cooperative functions automatically considering locations of devices in adjacent areas, according to an embodiment of the present invention;

DETAILED DESCRIPTION OF EMBODIMENTS OF THE PRESENT INVENTION

Figure 1B:
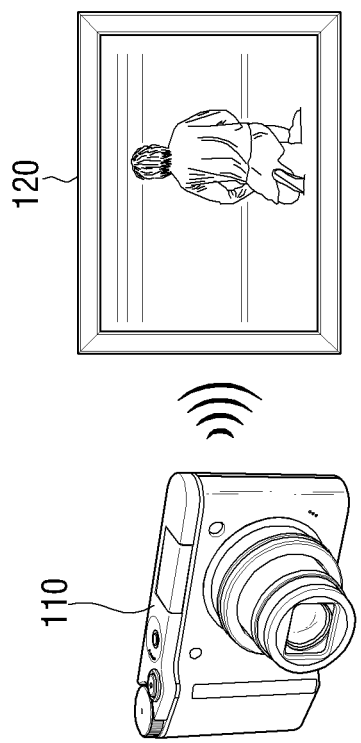

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

Figure 1A:
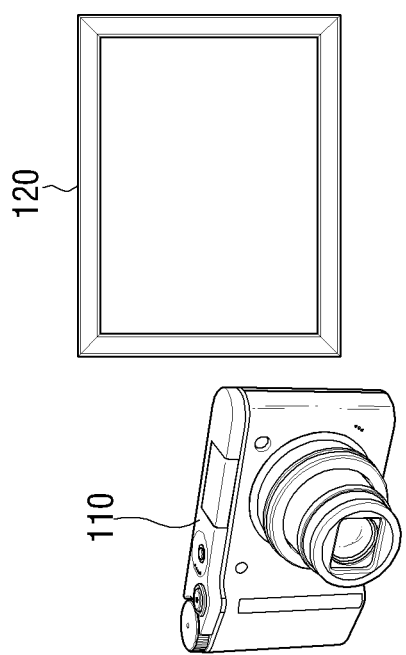

FIGS. 1A and 1B are diagrams illustrating a method for performing a cooperative function automatically according to a first embodiment of the present invention. FIG. 1A illustrates that a digital camera 110 is adjacent to an electronic frame 120 (within a predetermined distance).

If the digital camera 110 is adjacent to the electronic frame 120 as illustrated in FIG. 1A, a cooperative function is automatically performed by the digital camera 110 and the electronic frame 120 as illustrated in FIG. 1B.

FIG. 1B illustrates that the digital camera 110 transmits stored photos to the electronic frame 120, and the electronic frame 120 reproduces the photos received from the digital camera 110 as a slideshow.

In order to perform the above cooperative function, the digital camera 110 is preset to transmit stored photos to the electronic frame 120 if the digital camera 110 is adjacent to the electronic frame 120.

In addition, in order to perform the above cooperative function, the electronic frame 120 is preset to reproduce the photos received from the digital camera 110 as a slideshow if the electronic frame 120 is adjacent to the digital camera 110.

Once the cooperative function starts between the digital camera 110 and the electronic frame 120, the cooperative function continues even if the distance between the two becomes wide.

Figure 2B:
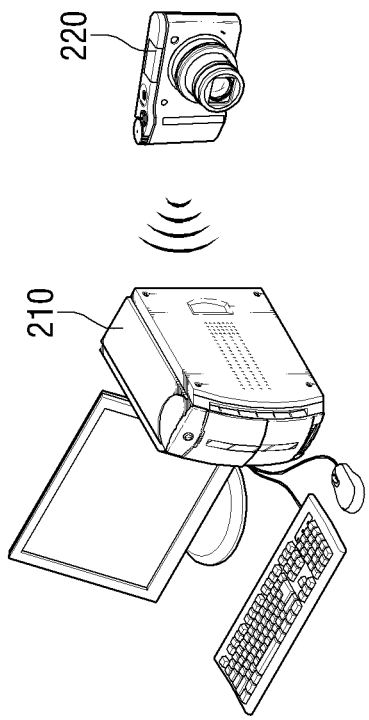
Figure 2A:
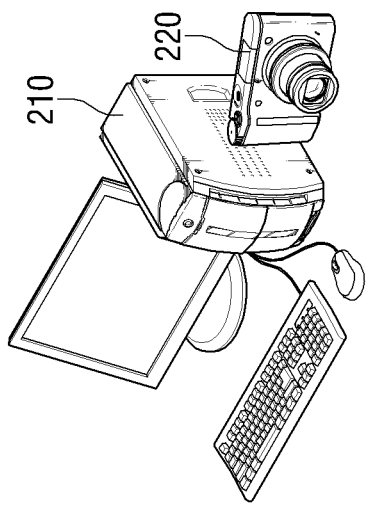

FIGS. 2A and 2B are diagrams illustrating a method for performing a cooperative function automatically, according to a second embodiment of the present invention. FIG. 2A illustrates that a digital camera 220 is adjacent to a Personal Computer (PC) 210.

If the digital camera 220 is adjacent to the PC 210 as illustrated in FIG. 2A, a cooperative function is automatically performed by the digital camera 220 and the PC 210, as illustrated in FIG. 2B.

FIG. 2B illustrates that the digital camera 220 transmits additionally stored photos to the PC 210, and the PC 210 backs-up the photos received from the digital camera 220 in a designated folder of the Hard Disk Drive (HDD).

In order to perform the above cooperative function, the digital camera 220 is preset to transmit additionally stored photos to the PC 210 if the digital camera 220 is adjacent to the PC 210.

In addition, in order to perform the above cooperative function, the PC 210 is preset to back-up the photos received from the digital camera 220 in a designated folder of the HDD if the PC 210 is adjacent to the digital camera 220.

Once the cooperative function starts between the PC 210 and the digital camera 220, the cooperative function continues even if the distance between the two becomes wide.

Figure 3A:
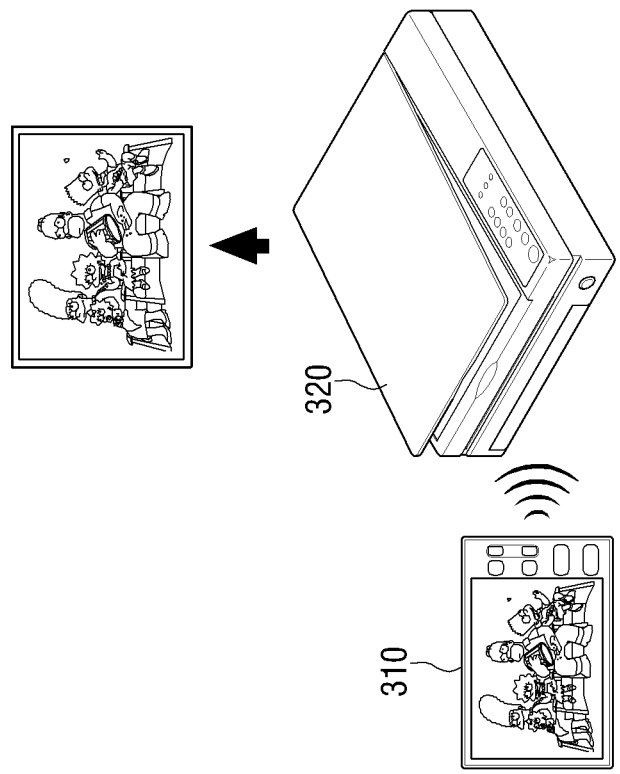
Figure 3B:
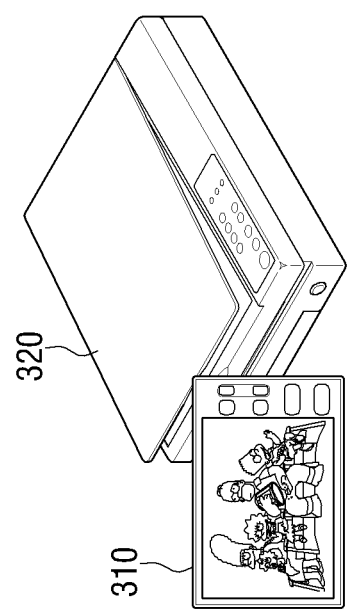

FIGS. 3A and 3B are diagrams illustrating a method for performing a cooperative function automatically, according to a third embodiment of the present invention. FIG. 3A illustrates that a digital camera 310, which is reproducing photos, is adjacent to a printer 320.

If the digital camera 310 is adjacent to the printer 320 as illustrated in FIG. 3A, a cooperative function is automatically performed by the digital camera 310 and the printer 320, as illustrated in FIG. 3B.

FIG. 3B illustrates that the digital camera 310 transmits photos which are being reproduced to the printer 320, and the printer 320 prints the photos received from the digital camera 310.

In order to perform the above cooperative function, the digital camera 310 is preset to transmit photos that are currently being reproduced to the printer 320 if the digital camera 310 is adjacent to the printer 320.

In addition, in order to perform the above cooperative function, the printer 320 is preset to print the photos received from the digital camera 310 if the printer 320 is adjacent to the digital camera 310.

If an MP3 player, which is reproducing music, is adjacent to the printer 320, the MP3 player transmits information regarding the current music to the printer 320 and the printer 320 may download the lyrics or music book of the current music through the Internet and print them.

Figure 4B:
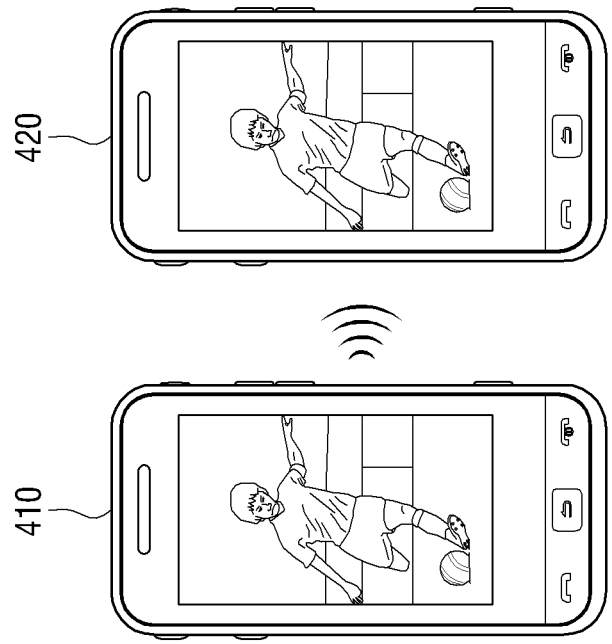
Figure 4A:
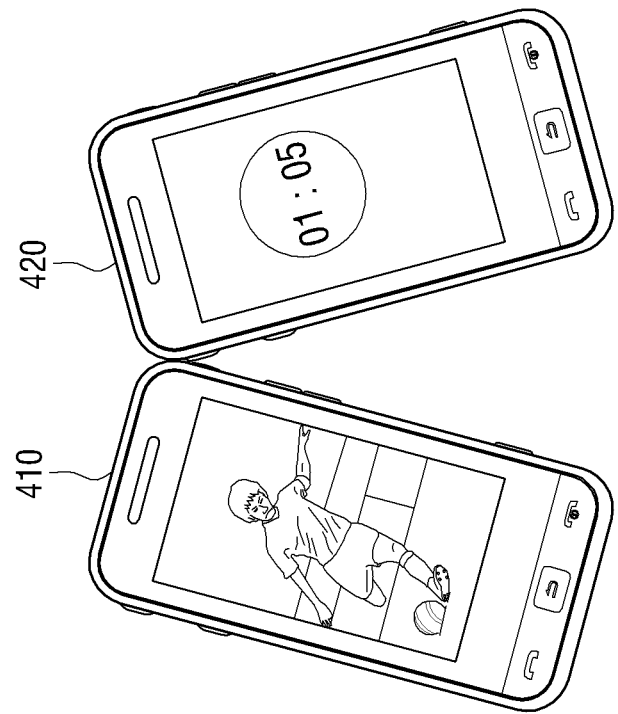

FIGS. 4A and 4B are diagrams illustrating a method for performing a cooperative function automatically, according to a fourth embodiment of the present invention. FIG. 4A illustrates that a mobile phone-A 410, which is reproducing photos, is adjacent to a mobile phone-B 420, which is in a standby mode.

If the mobile phone-A 410 is adjacent to the mobile phone-B 420 as illustrated in FIG. 4A, a cooperative function is automatically performed by the mobile phone-A 410 and the mobile phone-B 420, as illustrated in FIG. 4B.

FIG. 4B illustrates that the mobile phone-A 410 transmits photos, which are currently being reproduced, to the mobile phone-B 420, and the mobile phone-B 420 changes its mode from a standby mode to a photo play mode, and displays the photos received from the mobile phone 410 on a screen.

In order to perform the above cooperative function, the mobile phone-A 410 is preset to transmit photos, which are currently being reproduced to the mobile phone-B 420, if the mobile phone-A 410 is adjacent to the mobile phone-B 420.

In addition, in order to perform the above cooperative function, the mobile phone 420 is preset to display the photos received from the mobile phone-A 410 if the mobile phone 420-B is adjacent to the mobile phone-A 410.

Once the cooperative function starts between the mobile phone-A 410 and the mobile phone-B 420, the cooperative function continues even if the distance between the two becomes wide.

Figure 5A:
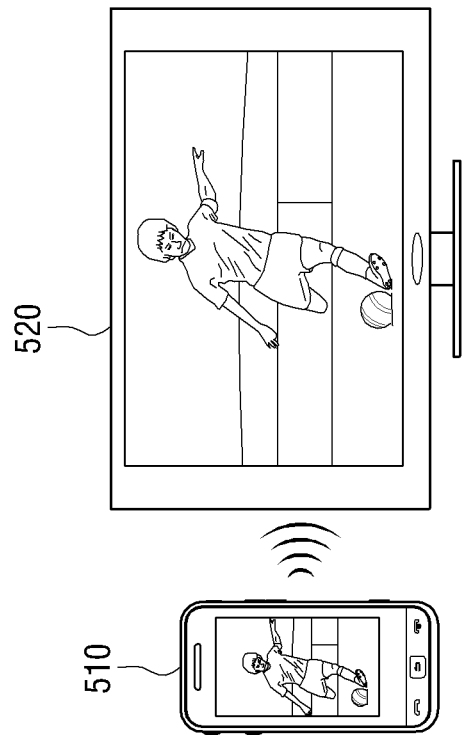
Figure 5B:
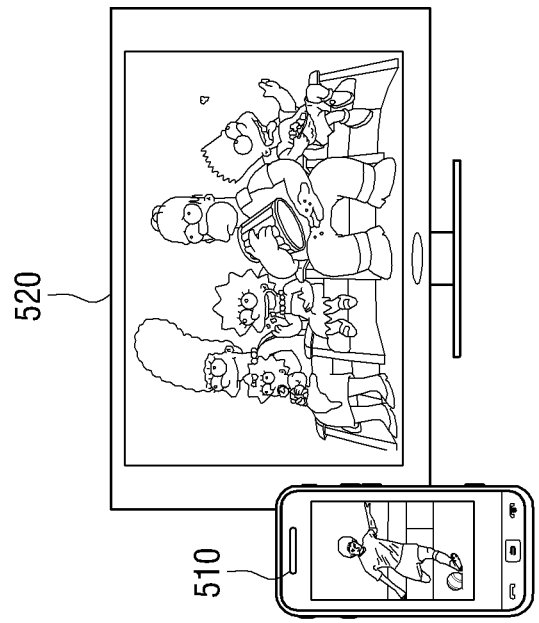

FIGS. 5A and 5B are diagrams illustrating a method for performing a cooperative function automatically, according to a fifth embodiment of the present invention. FIG. 5A illustrates that a mobile phone-A 510, which is reproducing photos, is adjacent to a television (TV) 520, which is reproducing broadcast.

If the mobile phone 510 is adjacent to the TV 520 as illustrated in FIG. 5A, a cooperative function is automatically performed by the mobile phone 510 and the TV 520, as illustrated in FIG. 5B.

FIG. 5B illustrates that the mobile phone 510 transmits photos, which are currently being reproduced, to the TV 520, and the TV 520 stops reproducing broadcast and reproduces the photos received from the mobile phone 510.

In order to perform the above cooperative function, the mobile phone 510 is preset to transmit photos, which are currently being reproduced, to the TV 520 if the mobile phone 510 is adjacent to the TV 520.

In addition, in order to perform the above cooperative function, the TV 520 is preset to reproduce the photos received from the mobile phone 510 if the TV 520 is adjacent to the mobile phone 510.

Once the cooperative function starts between the mobile phone 510 and the TV 520, the cooperative function continues even if the distance between the two becomes wide.

FIGS. 6A and 6B are diagrams illustrating a method for performing a cooperative function automatically, according to a sixth embodiment of the present invention. FIG. 6A illustrates that a digital camcorder 610 is adjacent to a TV 620, which is reproducing broadcast.

If the digital camcorder 610 is adjacent to the TV 620 as illustrated in FIG. 6A, a cooperative function is automatically performed by the digital camcorder 610 and the TV 620, as illustrated in FIG. 6B.

FIG. 6B illustrates that the digital camcorder 610 transmits images currently being photographed to the TV 620, and the TV 620 stops reproducing broadcast and reproduces the images received from the digital camcorder 610.

In order to perform the above cooperative function, the digital camcorder 610 is preset to transmit images, which are currently being photographed, to the TV 620 if the digital camcorder 610 is adjacent to the TV 620.

In addition, in order to perform the above cooperative function, the TV 620 is preset to reproduce the images received from digital camcorder 610 if the TV 620 is adjacent to the digital camcorder 610.

Once the cooperative function starts between the digital camcorder 610 and the TV 620, the cooperative function continues even if the distance between the two becomes wide.

Figure 7B:
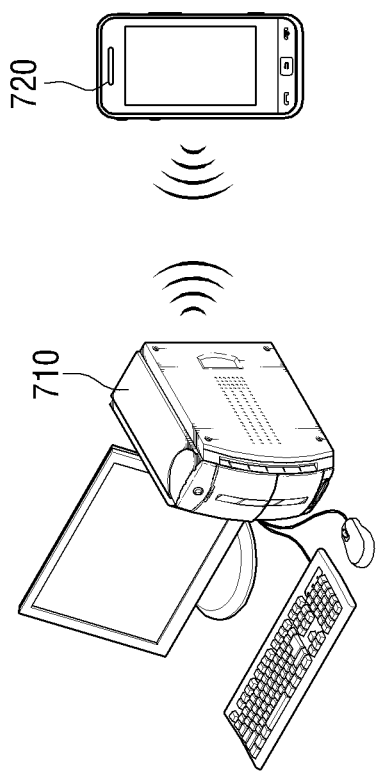
Figure 7A:
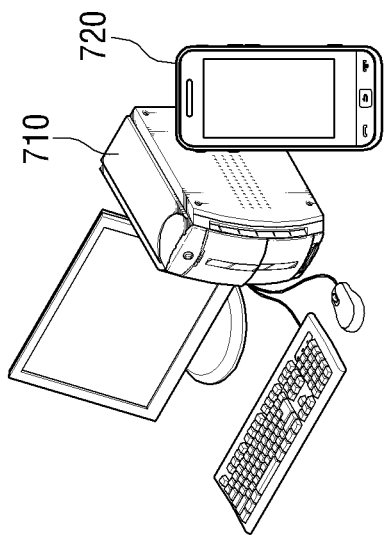

FIGS. 7A and 7B are diagrams illustrating a method for performing a cooperative function automatically, according to a seventh embodiment of the present invention. FIG. 7A illustrates that a mobile phone 720 is adjacent to a PC 710.

If the mobile phone 720 is adjacent to the PC 710 as illustrated in FIG. 7A, a cooperative function is automatically performed by the mobile phone 720 and the PC 710 as illustrated in FIG. 7B.

FIG. 7B illustrates that the mobile phone 720 transmits stored schedule information to the PC 710, and the PC 710 backs-up the schedule information received from the mobile phone 720 in a designated folder.

In order to perform the above cooperative function, the mobile phone 720 is preset to transmit stored schedule information to the PC 710 if the mobile phone 720 is adjacent to the PC 710.

In addition, in order to perform the above cooperative function, the PC 710 is preset to back-up the schedule information received from the mobile phone 720 in a designated folder if the PC 710 is adjacent to the mobile phone 720.

Once the cooperative function starts between the mobile phone 720 and the PC 710, the cooperative function continues even if the distance between the two becomes wide.

Figure 8:
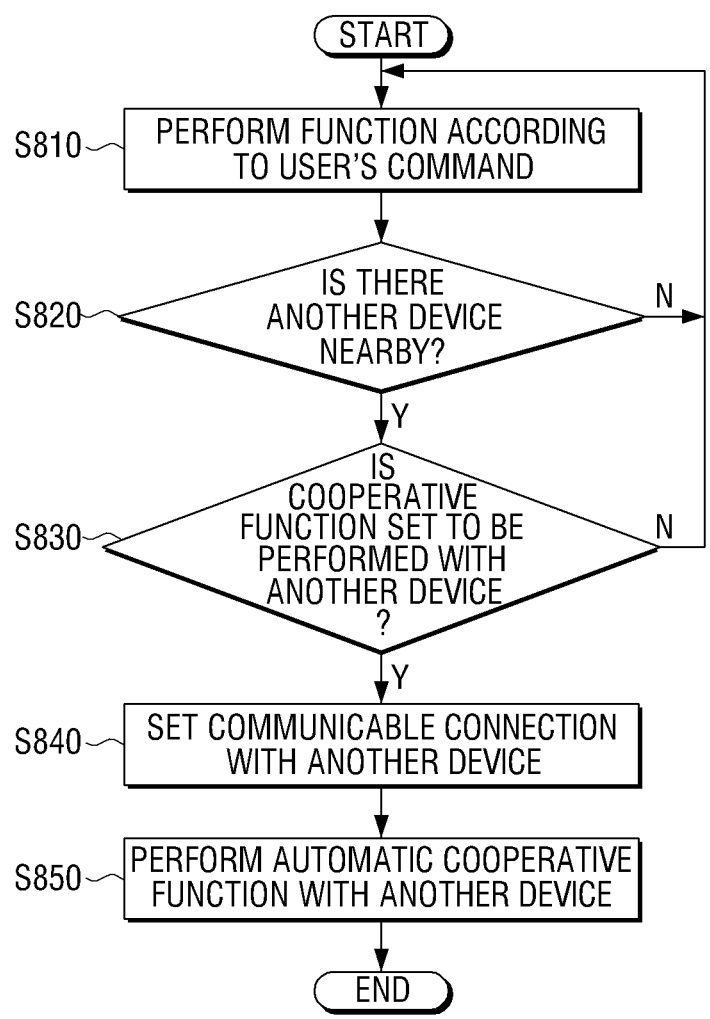
FIG. 8 is a flowchart illustrating a method for performing a cooperative function automatically among devices in adjacent areas, according to an embodiment of the present invention.

FIG. 8 is a flowchart illustrating a method for performing a cooperative function automatically among devices in adjacent areas, according to an embodiment of the present invention.

As illustrated in FIG. 8, a device performs a function according to a user's command in step S810, and determines whether there is another device in surrounding areas in step S820.

If it is determined that there is another device nearby in step S820, the device determines whether an automatic cooperative function is set between the device and the other device in step S830.

If it is determined that an automatic cooperative function is set in step S830, the device sets a communicable connection with the other device in step S840.

Subsequently, the device performs the cooperative function with the other device automatically in step S850.

Figure 9B:
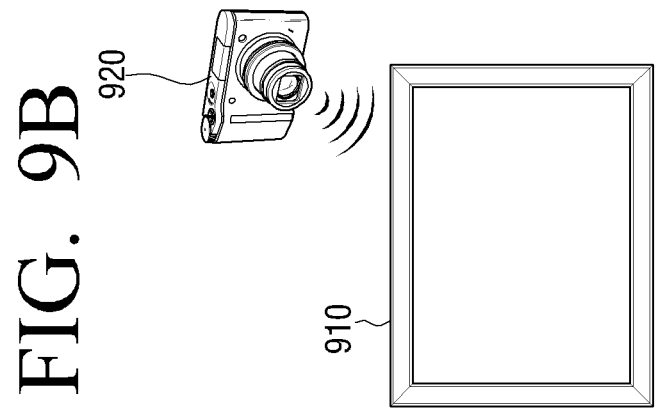
FIGS. 9A to 10B are diagrams illustrating a concept of performing a cooperative function automatically which is set in advance considering locations of devices in adjacent areas, according to an embodiment of the present invention.
Figure 9A:
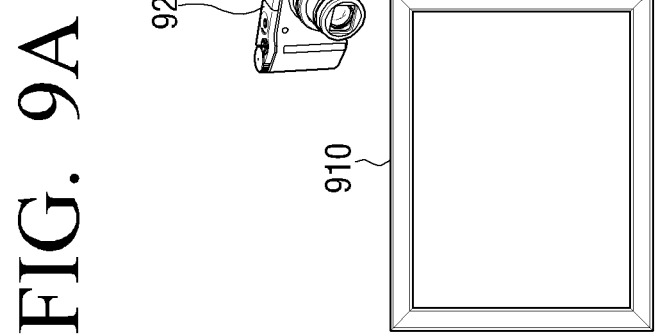

FIGS. 9A and 9B and FIGS. 10A and 10B are a diagrams illustrating a method for performing a cooperative function automatically, according to an eighth embodiment of the present invention. FIG. 9A illustrates that a digital camera 920 is adjacent to the 'back' of an electronic frame 910.

If the digital camera 920 is adjacent to the back of the electronic frame 910 as illustrated in FIG. 9A, a cooperative function is automatically performed by the digital camera 920 and the electronic frame 910 as illustrated in FIG. 9B.

FIG. 9B illustrates that the digital camera 920 transmits stored photos to the electronic frame 910, and the electronic frame 910 backs-up the photos received from the digital camera 920 in its own storage medium.

In order to perform the above cooperative function, the digital camera 920 is preset to transmit stored photos to the electronic frame 910 if the digital camera 920 is adjacent to the back of the electronic frame 910.

In addition, in order to perform the above cooperative function, the electronic frame 910 is preset to back-up the photos received from the digital camera 920 if the back of electronic frame 910 is adjacent to the digital camera 920.

Once the cooperative function starts between the digital camera 920 and the electronic frame 910, the cooperative function continues even if the distance between the two becomes wide.

Figure 10B:
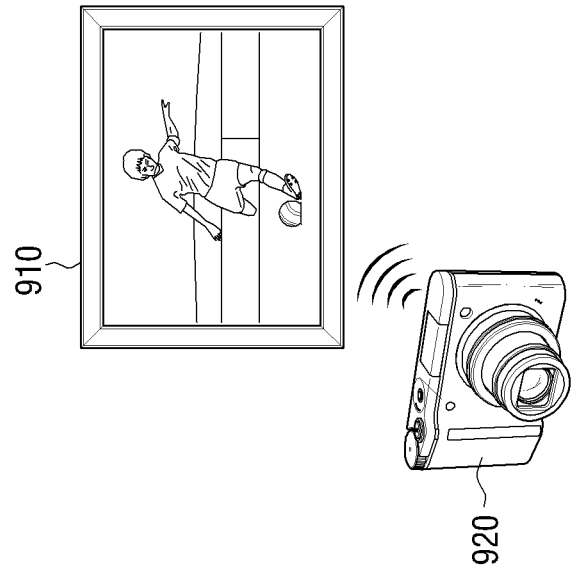
Figure 10A:
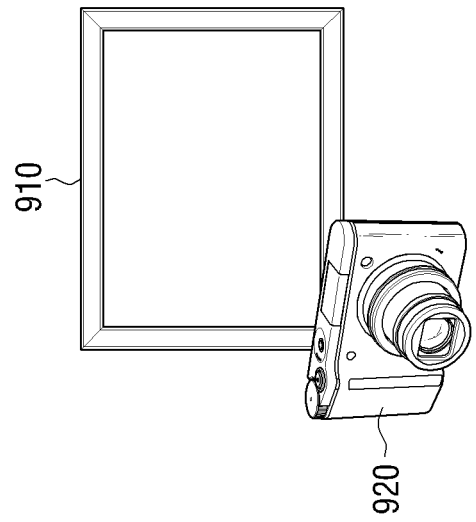

FIG. 10A illustrates that the digital camera 920 is adjacent to the 'front' of the electronic frame 910.

If the digital camera 920 is adjacent to the front of the electronic frame 910 as illustrated in FIG. 10A, a cooperative function is automatically performed by the digital camera 920 and the electronic frame 910 as illustrated in FIG. 10B.

FIG. 10B illustrates that the digital camera 920 transmits stored photos to the electronic frame 910, and the electronic frame 910 reproduces the photos received from the digital camera 920 as a slideshow.

In order to perform the above cooperative function, the digital camera 920 is preset to transmit stored photos to the electronic frame 910 if the digital camera 920 is adjacent to the front of the electronic frame 910.

In addition, in order to perform the above cooperative function, the electronic frame 910 is preset to reproduce the photos received from the digital camera 920 as a slideshow if the front of electronic frame 910 is adjacent to the digital camera 920.

Once the cooperative function starts between the digital camera 920 and the electronic frame 910, the cooperative function continues even if the distance between the two becomes wide.

FIG. 11 is a flowchart illustrating a method for performing different cooperative functions automatically considering locations of devices in adjacent areas, according to an embodiment of the present invention.

As illustrated in FIG. 11, a device performs a function according to a user's command in step S1110 and determines whether there is another device in surrounding areas in step S1120.

If it is determined that there is another device nearby in step S1120, the device identifies the location of the other device in step S1130.

Subsequently, the device identifies an automatic cooperative function that should be performed together with the other device based on the location of the other device in step S1140.

The device sets a communicable connection with the other device in step S1150. Subsequently, the device performs the cooperative function with the other device automatically in step S1160.

FIGS. 12A and 12B, FIGS. 13A and 13B, and FIGS. 14A and 14B are diagrams illustrating a method for performing a cooperative function automatically, according to a ninth embodiment of the present invention.

Figure 12B:
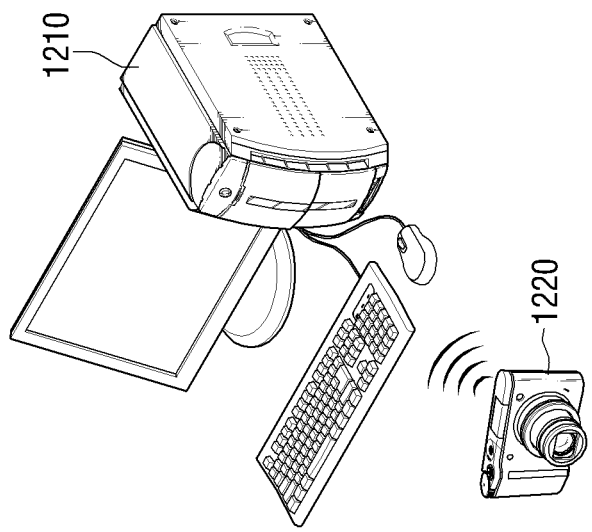
FIGS. 12A to 14B are diagrams illustrating a method for performing different cooperative functions automatically according to locations of devices in adjacent areas, according to an embodiment of the present invention.
Figure 12A:
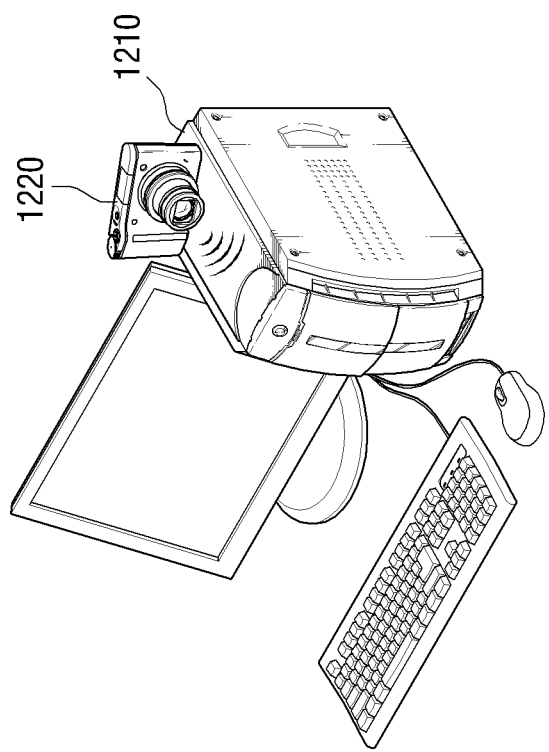

FIG. 12A illustrates that a digital camera 1220 is located on the main body of a PC 1210, and FIG. 12B illustrates that the digital camera 1220 is located in front of the main body of the 1210.

As illustrated in FIG. 12A, if the digital camera 1220 is located on the main body of the PC 1210, the digital camera 1220 may transmit stored photos to the PC 1210 and the PC 1210 may back-up the photos received from the digital camera 1220 in its own storage medium as a cooperative function is automatically performed by the digital camera 1220 and the PC 1210.

As illustrated in FIG. 12B, if the digital camera 1220 is located in front of the main body of the PC 1210, the digital camera 1220 may transmit stored photos to the PC 1210 and the PC 1210 may reproduce the photos received from the digital camera 1220 as a slideshow as a cooperative function is automatically performed by the digital camera 1220 and the PC 1210.

Figure 13B:
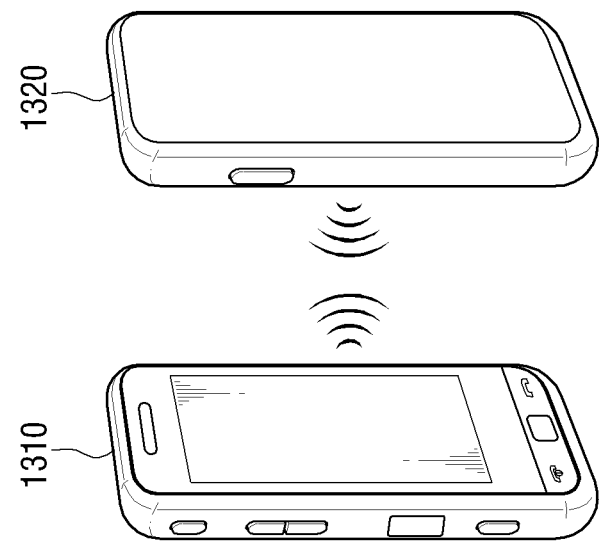
Figure 13A:
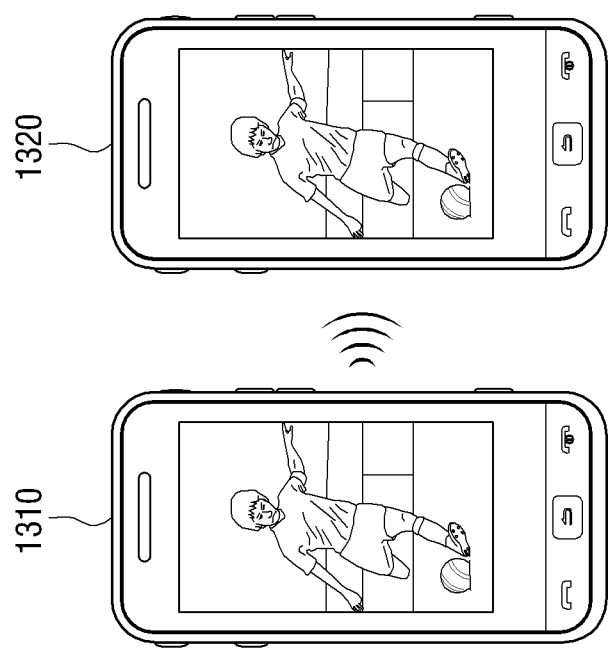

As illustrated in FIG. 13A, if the liquid crystal of a mobile phone-A 1310 and the liquid crystal of a mobile phone-B 1320 are placed side by side facing an upper or lower direction, the address book stored in the mobile phone-A 1310 may be synchronized with the address book stored in the mobile phone-B 1320 as a cooperative function is automatically performed by the mobile phone-A 1310 and the mobile phone-B 1320.

As illustrated in FIG. 13B, if the mobile phone-A 1310 and the mobile phone-B 1320 face each other, the photos stored in the mobile phone-A 1310 may be synchronized with the photos stored in the mobile phone-B 1320 as a cooperative function is automatically performed by the mobile phone-A 1310 and the mobile phone-B 1320.

Figure 14A:
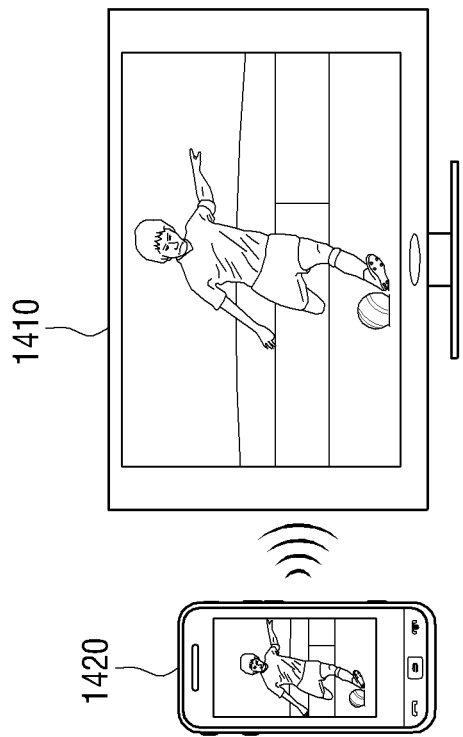

As illustrated in FIG. 14A, if a mobile phone 1420 is located in front of a TV 1410, the mobile phone 1420 may transmit stored photos to the TV 1410, and the TV 1410 may reproduce the photos received from the mobile phone 1420 as a slideshow as a cooperative function is automatically performed by the mobile phone 1420 and the TV 1410.

Figure 14B:
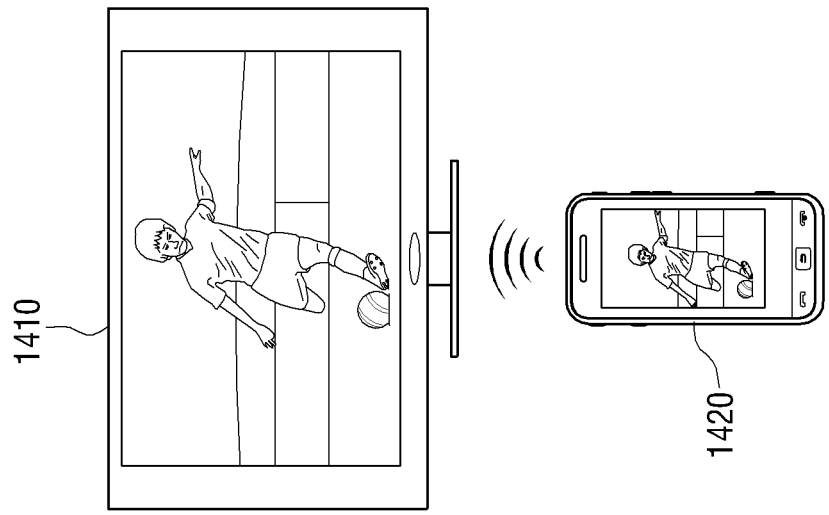

In addition, as illustrated in FIG. 14B, if the mobile phone 1420 is located next to the TV 1410, the contents stored in the mobile phone 1420 may be synchronized with the contents stored in the hard-disk of the TV 1410 or the contents stored in the USB connected to the TV.

In the above embodiments, a cooperative function is automatically performed when two devices become close to each other, but this is only an example. A cooperative function may also be automatically performed when two devices are in contact with each other.

In this case, the type of cooperative function to be performed may be determined depending on which part of a device is contacted by another device. For example, if the device is in contact with the "front" of another device, "a first" cooperative function may be performed, and if the device is in contact with the "back" of another device, "a second" cooperative function may be performed.

To sense which part of the device in contact with another device, sensors should be formed on the surface of the other device.

In addition, the type of cooperative function to be performed may be determined depending on which part of a device contacts which part of another device. For example, if the "front" of the device contacts the "front" of another device, "the first" cooperative function may be performed, and if the "back" of the device contacts the "back" of another device, "the second" cooperative function may be performed.

The type of cooperative function performed by devices may be determined by a user. In addition, the type of cooperative function that is already set may be changed by a user.

A cooperative function may be automatically set according to the properties of a device. For example, since the properties of a camera include taking pictures and the properties of a printer includes printing, a cooperative function may be automatically set as the camera taking pictures and the printer printing the photographed pictures.

The devices mentioned in the above embodiments are only examples. The technical feature of the present invention may be applied to other devices.

Figure 15:
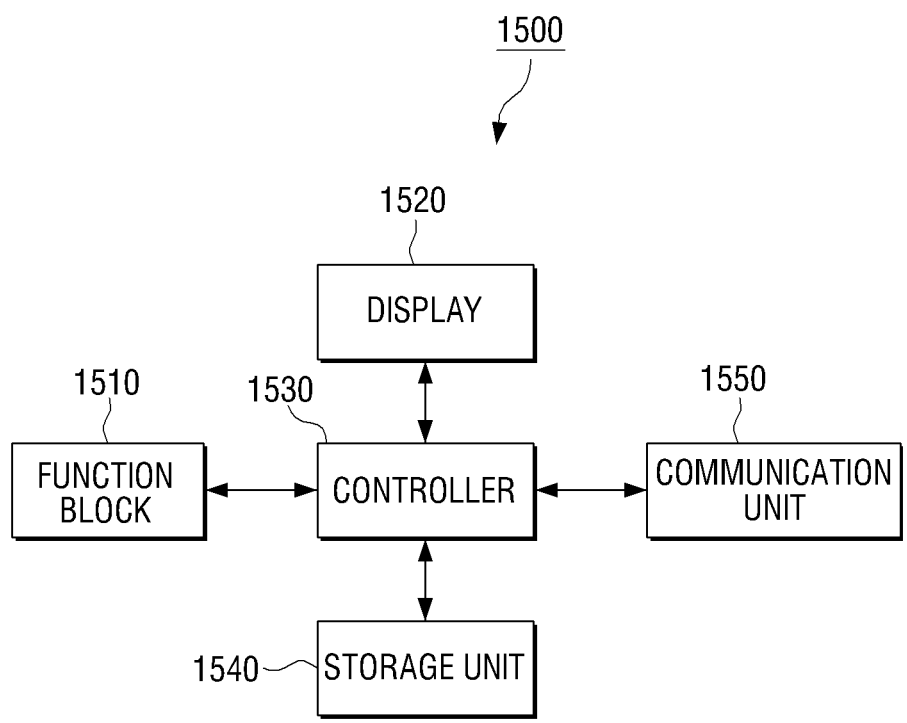
FIG. 15 is a block diagram of a device, according to an embodiment of the present invention.

FIG. 15 is a block diagram of a device to which the present invention is applicable. The device includes a function block 1510, a display 1520, a controller 1530, a storage unit 1540 and a communication unit 1550.

The function block 1510 performs an original function of the device. If the device is a mobile phone, the function block performs telephone communication and SMS, and if the device is a TV, the function block 1510 performs broadcast reception and reproduction.

The display 1520 displays the performance result of the function block 1510 and the GUI.

The storage unit 1540 is a storage medium to store programs necessary to perform the function of the function block 1510 and to provide the GUI, contents, and other data.

The communication unit 1550 senses whether another device approaches a device in surrounding areas, and sets a communicable connection between the device and a sensed device.

In addition, the communication unit 1550 senses the location of another device in surrounding areas. For example, the communication unit 1550 senses from which sides among front, back, left and right another device approaches. To do so, the communication unit 1550 may use a plurality of directional antennas and a plurality of directional sensors.

Meanwhile, the communication unit 1550 may have a bi-directional wireless communication module to sense the location of other devices in surrounding areas. In this case, there is no limitation to the method of wireless communication of the bi-directional wireless communication module. Therefore, the wireless communication may be realized as infrared communication, sound wave communication, an RF communication, or wireless network communication.

The controller 1530 controls the device to perform a cooperative function with another device through the process illustrated in FIGS. 8 and 11.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method for performing a cooperative function by a multimedia device, comprising the steps of:
   determining whether there is another multimedia device in a surrounding area of the multimedia device; and
   selecting one cooperative function from among a plurality of cooperative functions according to a relative position of the multimedia device with respect to the another multimedia device and performing the selected cooperative function, by the multimedia device, with the another multimedia device.

2. The method as claimed in claim 1, further comprising:
   determining, by the multimedia device, the relative position,
   wherein performing the selected cooperative function comprises performing a first cooperative function by the multimedia device when it is determined that the another multimedia device is located in a first relative position, and performing a second cooperative function by the multimedia device when it is determined that the another multimedia device is located in a second relative position.

3. The method as claimed in claim 1, comprising:
   automatically performing, in the multimedia device, a back-up of photos stored in the another multimedia device when the another multimedia device is above the multimedia device; and
   reproducing photos stored in the another multimedia device as a slideshow in the multimedia device when the another multimedia device is in front of the multimedia device.

4. The method as claimed in claim 1, comprising:
   synchronizing an address book stored in the another multimedia device with an address book stored in the multimedia device when the another multimedia device and the multimedia device are side by side; and
   synchronizing photos stored in the another multimedia device with photos stored in the multimedia device when the another multimedia device faces the multimedia device.

5. The method as claimed in claim 1, comprising:
   reproducing photos stored in the another multimedia device as a slideshow in the multimedia device when the another multimedia device is in front of the multimedia device; and synchronizing contents stored in the another multimedia device with contents stored in or connected to the multimedia device when the another multimedia device is located next to the multimedia device.

6. The method as claimed in claim 1, wherein performing the selected cooperative function comprises performing the selected cooperative function when the cooperative function is preset.

7. The method as claimed in claim 1, wherein performing the selected cooperative function comprises stopping a function that is being performed by the multimedia device and performing the selected cooperative function.

8. The method as claimed in claim 1, wherein performing the selected cooperative function comprises performing the selected cooperative function continuously even if the another multimedia device becomes distant from the multimedia device.

9. The method as claimed in claim 1, wherein the multimedia device is capable of at least one of reproducing a multimedia content and generating the multimedia content, and
wherein the multimedia content comprises at least one of a photo and a moving image.

10. The method as claimed in claim 1, wherein the determining detects the location of the another multimedia device using at least one of a directional antenna or a directional sensor.

11. A multimedia device for performing a cooperative function with another multimedia device, the multimedia device comprising:
a communication unit that communicates with the another multimedia device; and
a controller that determines whether the another multimedia device is in a surrounding area of the multimedia device, controls the multimedia device to select one cooperative function from among a plurality of cooperative functions according to a relative position of the multimedia device with respect to the another multimedia device and perform the selected cooperative function with the another multimedia device.

12. The device as claimed in claim 11, wherein the controller determines the relative position, performs a first cooperative function when it is determined that the another multimedia device is located in a first relative position, and performs a second cooperative function when it is determined that the another multimedia device is located in a second relative position.

13. The device as claimed in claim 11, wherein the controller performs the selected cooperative function if the cooperative function is preset.

14. The device as claimed in claim 11, wherein the controller stops a function that is being performed by the multimedia device and performs the selected cooperative function.

15. The device as claimed in claim 11, wherein the controller performs the selected cooperative function continuously even if the another multimedia device becomes distant from the multimedia device.

16. A system for performing a cooperative function, comprising:
a first multimedia device; and
a second multimedia device that determines whether the first multimedia device is in a surrounding area of the second multimedia device, selects one cooperative function from among a plurality of cooperative functions according to a relative position of the first multimedia device with respect to the second multimedia device, and performs the selected cooperative function with the first multimedia device.

17. The system as claimed in claim 16, wherein the second multimedia device determines the relative position, performs a first cooperative function when it is determined that the first multimedia device is located in a first relative position, and performs a second cooperative function when it is determined that the first multimedia device is located in a second relative position.

18. A method for performing a cooperative function by a multimedia device, comprising the steps of:
determining whether there is another multimedia device in a surrounding area of the multimedia device; and
selecting one cooperative function from among a plurality of cooperative functions according to a relative position of the multimedia device with respect to the another multimedia device and performing selected the cooperative function, by the multimedia device, with the another multimedia device according to a type of the another multimedia device.

19. The method as claimed in claim 18, further comprising:
determining, by the multimedia device, the relative position,
wherein performing the selected cooperative function comprises:
performing a first cooperative function by the multimedia device when it is determined that first type of the another multimedia device is located in a first relative position; and
performing a second cooperative function by the multimedia device when it is determined that second type of the another multimedia device is located in a second relative position.

20. The method as claimed in claim 18, wherein when the another multimedia device is a type capable of reproducing a multimedia content, the multimedia device transmits the multimedia content to the another multimedia device and the another multimedia device reproduces the multimedia content received from the multimedia device.

21. The method as claimed in claim 18, wherein when the another multimedia device is a type capable of storing a multimedia content, the multimedia device transmits the multimedia content to the another multimedia device and the another multimedia device stores the multimedia content received from the multimedia device.

22. The method as claimed in claim 18, wherein when the another multimedia device is a type capable of printing a multimedia content, the multimedia device transmits the multimedia content to the another multimedia device and the another multimedia device prints the multimedia content received from the multimedia device.

* * * * *